Figure 1:
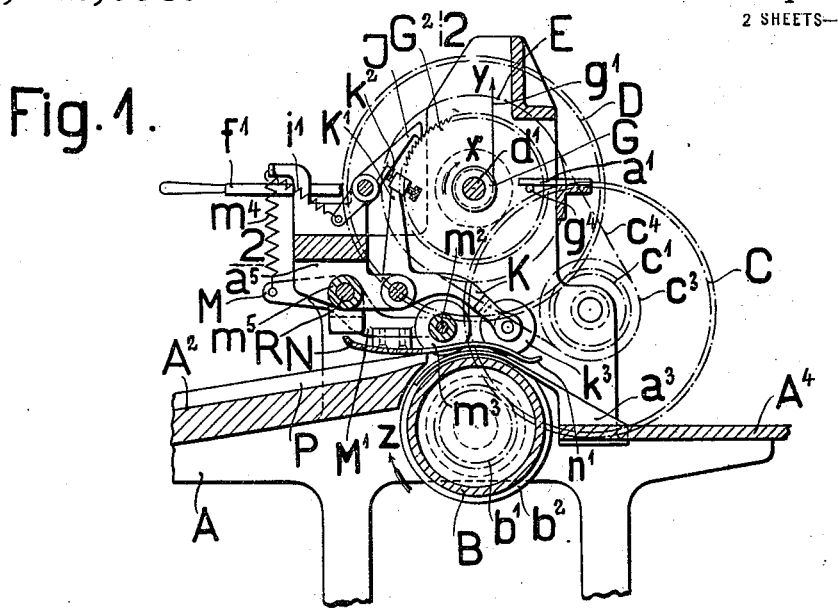

H. THUN.
AREA MEASURING MACHINE.
APPLICATION FILED DEC. 7, 1920.

1,412,095.

Patented Apr. 11, 1922.
2 SHEETS—SHEET 1.

Inventor
Hermann Thun
By Knight Bros
Attys

H. THUN.
AREA MEASURING MACHINE.
APPLICATION FILED DEC. 7, 1920.

1,412,095.

Patented Apr. 11, 1922.
2 SHEETS—SHEET 2.

Inventor
Hermann Thun
By Knight Bros
Attys

UNITED STATES PATENT OFFICE.

HERMANN THUN, OF ESSEN-ON-THE-RUHR, GERMANY, ASSIGNOR TO FRIED. KRUPP AKTIENGESELLSCHAFT, OF ESSEN-ON-THE-RUHR, GERMANY.

AREA-MEASURING MACHINE.

1,412,095. Specification of Letters Patent. Patented Apr. 11, 1922.

Application filed December 7, 1920. Serial No. 429,025.

*To all whom it may concern:*

Be it known that I, HERMANN THUN, residing at Essen-on-the-Ruhr, Germany, a citizen of the German Republic, have invented a certain new and useful Improvement in an Area-Measuring Machine, (for which I have applied for a patent in Germany September 4, 1919,) of which the following is a specification.

The invention relates to area measuring machines particularly those intended for the measurement of leather, in which parts which can be raised from a support beneath, put into action an indicator devices through the medium of an adding mechanism. The object of the invention is chiefly to simplify the gearing intended to bring the indicator device into action.

On the drawing there is shown diagrammatically as an example of construction of the subject matter of the invention, a leather measuring machine. On this drawing:

Fig. 1 is a lateral elevation of the leather measuring machine.

Figure 2:
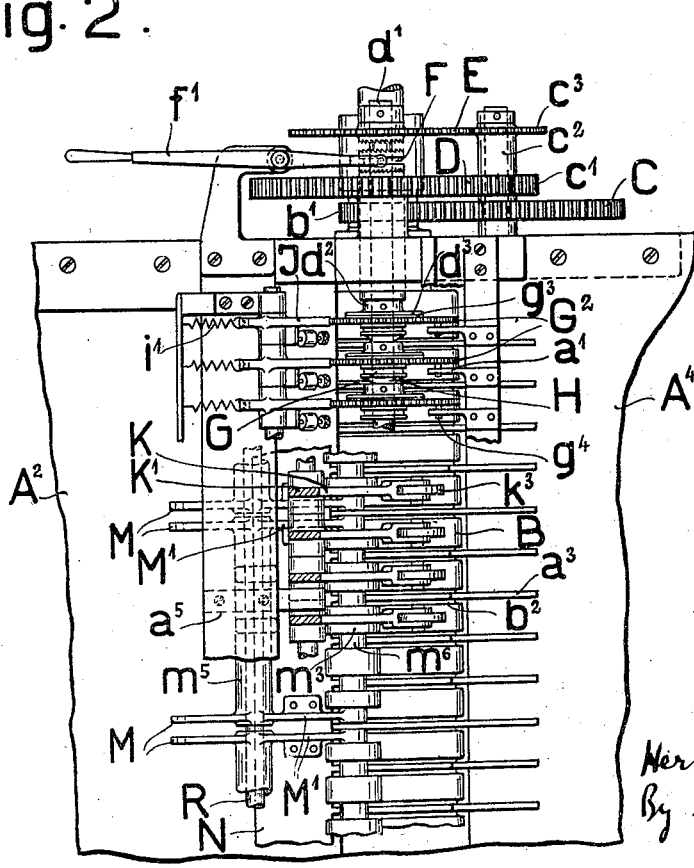

Fig. 2 a plan view of Fig. 1 partly in section through 2—2.

Figure 3:
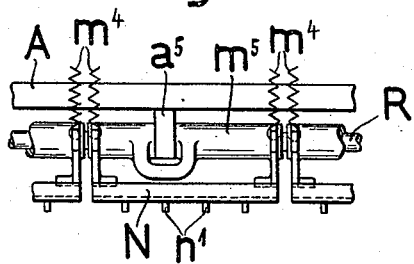

Fig. 3 a part view of Fig. 1, on an enlarged scale, seen from the left.

Figure 4:
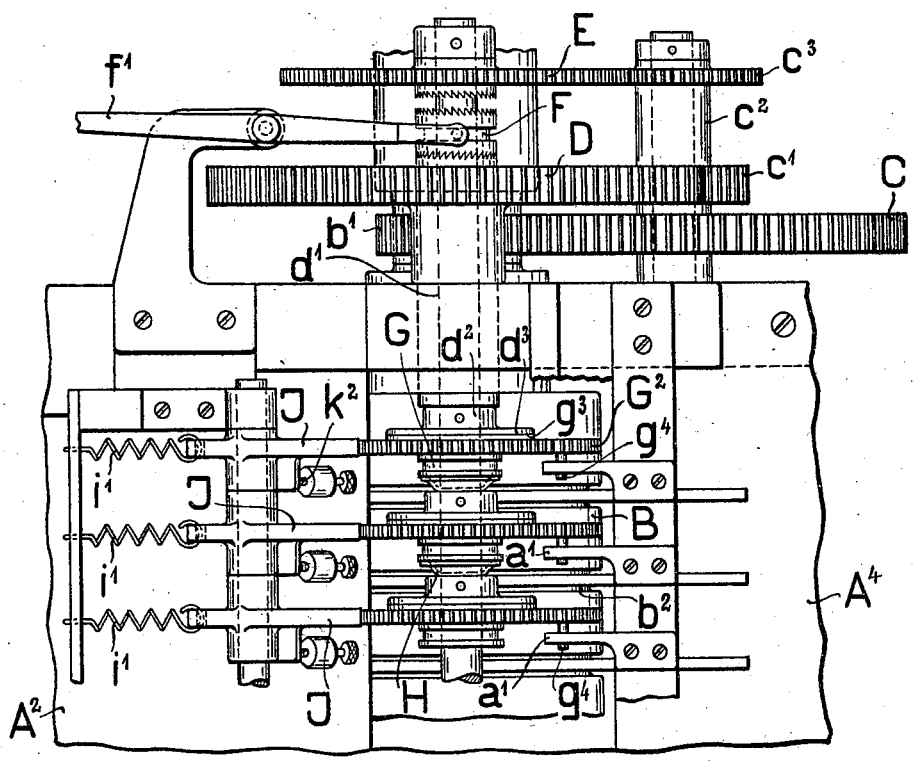

Fig. 4 a view corresponding to Fig. 2 on a larger scale.

A driving roller B rotarily mounted on the frame A of the leather measuring machine, is connected through a pinion gearing $b^1$, C, $c^1$ with a toothed wheel D loosely rotatable on a shaft $d^1$. The pinions C $c^1$ are mounted on a loosely rotatable hollow shaft $c^2$ (Figs. 2 and 4) which carries a further toothed wheel $c^3$. The toothed wheel $c^3$ is positively connected by a sprocket chain $c^4$ (Fig. 1) with a toothed wheel E likewise mounted loosely rotatable on the shaft $d^1$. Between the toothed wheels D and E a toothed coupling F can slide on the shaft $d^1$ by means of a lever $f^1$ and rotate with this shaft. The object of the toothed coupling F is to couple up either the toothed wheel D or E with the shaft $d^1$ and the gearing formed by the parts $b^1$ C $c^1$ D $c^3$ $c^4$ E F $d^1$ therefore represents a change speed and reversing gear. On the shaft $d^1$ there are mounted at equal distances and loosely rotatable, a number of discs G every two of which are by means of a band $g^1$ connected with a measuring agency (not shown) of an indicator device containing a scale disc, in such manner that a rotation of one of the discs G in the direction of the arrow $x$ (Fig. 1) produces a rotation in the like direction of the scale disc. The scale disc is in its zero position when the several parts are in the position shown by Fig. 1. On the band $g^1$ a weight likewise not shown and acting on the scale disc, exerts a pull in the direction of the arrow $y$. Each disc G is rigidly connected with the ratchet wheel $G^2$ which is coupled by a friction clutch with the shaft $d^1$. The friction clutch is made up of two annular surfaces $g^3$ and $d^3$ (Figs. 2 and 4) lying against each other under the action of a plate spring H, one of which, $g^3$, is on the ratchet wheel $G^2$ and the other, $d^3$, on a coupling box $d^2$ which is fixedly keyed on the shaft $d^1$. Each ratchet wheel $G^2$ carries a pin $g^4$ which lies against a stop $a^1$ mounted on the frame A. Into the teeth of each ratchet wheel $G^2$ there engages a ratchet J mounted on the frame A and being under the action of a spring $i^1$, which ratchet is capable of preventing a rotation of the ratchet wheel $G^2$ in the direction of the arrow $x$. Against the ratchet J there lies in the manner particularly seen from Fig. 1, a set screw $k^2$, which is carried by the one arm $K^1$ of a crank lever K $K^1$ pivotally mounted on the frame A. At the end of the other arm, K, a pressure roller $k^3$ constituting a part which can be lifted up, is mounted and lies on the driving roller B. Seen in the direction of the arrow $x$ (Fig. 1) there lie on the driving roller B in front of the pressure rollers $k^3$ a number of pressure rollers $m^3$ which are loosely rotatable in groups of five (see particularly Fig. 2) on short shaft $m^2$ (Fig. 1). With the ends of the shafts $m^2$, the arms $M^1$ of crank levers M $M^1$ engage. The crank levers M $M^1$ are mounted at the ends of hollow shafts $m^5$, which are pivotally mounted by means of a continuous shaft R, on lugs $a^5$ of the frame A. The arms M of the crank levers M $M^1$ are under the action of springs $m^4$ (Figs. 1 and 5), which press the rollers $m^3$ against the driving shaft B. The individual pressure rollers $m^3$ of each group are separated from each other by grooves $m^6$ (Fig. 2). The pressure rollers $m^3$ are intended to lie above on the piece of leather which approaches on a guide table $A^2$ of the driving roller B and to press the leather against the driving roller B. To the under part of the arm $M^1$ there is screwed a guide plate N, extending over the width of one group each time, and having its free end somewhat lifted which serves to press down a piece of leather, P, the front end of which sometimes stands slightly away from the guide table $A^2$ and to guide it with certainty below the pressure rollers $m^3$. Towards the pressure rollers $m^3$ the guide plate N has on the side prongs $n^1$ like a comb, which pass through the grooves $m^6$ at intervals between the individual pressure rollers $m^3$ and $k^3$ in the manner appearing from Fig. 1 and are curved essentially in the form of an arc of a circle. On the driving roller B there are provided at equal distances, grooves $b^2$ into which stripping-off prongs $a^3$ project, the object of which is to strip off from the driving roller B the piece of leather moving between the latter and the pressure rollers $k^3$ and to guide it on to a delivery table $A^4$.

For the purpose of describing the mode of operation let it be assumed that the parts are in the position shown on the drawing, in which the indicator device (not shown) is in the zero position and any rotation of the ratchet wheels $G^2$ under the action of the pull in the direction of the arrow $y$ is prevented by the pins $g^4$ lying against the stops $a^1$. If the area of the piece of leather P is to be measured, the roller B is first of all set rotating in the direction of the arrow $z$ (Fig. 1). In this rotation, the pressure rollers $m^3$ and $k^3$ lying on the driving roller B are likewise rotated by friction. Furthermore by means of the gearing $b^1$ C $c^1$ D F, in the position shown in the drawing of the lever $f^1$, the shaft $d^1$ is rotated in the direction of the arrow $x$. At first however the discs G do not partake of this rotation of the shaft $d^1$ because the ratchet wheels $G^2$ rigidly connected with them, are held by the ratchets J in their original angular position. Thereupon the piece of leather P is passed on to the guide table $A^2$ on the driving roller B and if its forward part stands up from the table $A^2$, it is pressed down by the guide plate N. As soon as the piece of leather P comes into contact with the driving roller B and the pressure rollers $m^3$, it is carried along by the latter by friction and passed through the two. The pressure rollers $m^3$, which press on the leather piece P under the action of the spring $m^4$ smooth out the piece of leather. The leather P is kept in this flattened out position by the prongs $n^1$ during its further passage. The measuring process proper is then initiated at the moment at which the piece of leather P, moving over the driving roller B, reaches the pressure rollers $k^3$ and lifts the latter off the driving roller B. On the lifting of any of the pressure rollers $k^3$, the corresponding set screw $k^2$ forces the ratchet J out of the corresponding tooth gap, the ratchet wheel $G^2$ is released and is now driven, through the friction clutch $d^3$ $g^3$, by the shaft $d^1$ in the direction of the arrow $x$, the stop pin $g^4$ receding from the stop $a^1$. The rotation of the ratchet wheel $G^2$ is transmitted through the band $g^1$ to the scale disc of the indicator device which now rotates continuously in the direction of the arrow $x$ in proportion to the area of the leather piece passing through. The leather piece P, pressed against the driving roller B by the pressure of the rollers $m^3$ and $k^3$, after it has appeared from beneath the pressure roller $k^3$, is stripped off the roller B by the stripping-off prongs $a^3$ and guided over on to the delivery table $A^4$. At the conclusion of the measuring process, the end of the leather piece P glides out from beneath the roller $k^3$ and the latter, under the pressure of the spring $i^1$, again comes to lie on the driving roller B. The ratchet J therefore comes into engagement with the ratchet wheel $G^2$, so that the latter, and with it the band $g^1$ operating the scale disc of the indicator device, are stopped from further movement. The measuring process is now at an end.

If the parts of the machine are now to be brought back into the position shown on the drawing, the lever $f^1$ and with it the coupling box F are put back into the position in which the gear wheel E is coupled with the shaft $d^1$. The shaft $d^1$ now rotates (as can straightway be seen from Fig. 1), in the opposite direction to the arrow $x$. This rotation is shared by the ratchet wheel $G^2$ and disc G, connected with the shaft $d^1$ by the friction clutch $d^3$ $g^3$, as the ratchet J which only stops movement in one direction, forms no hindrance to a rotation of the ratchet wheel $G^2$ in the direction in question. The scale disc of the indicator device meantime under the action of the weight attacking it, likewise rotates in an opposite direction to the arrow $x$, the band $g^1$ moving in the direction of the arrow $y$. As soon as the pin $g^4$ strikes against the stop $a^1$, the corresponding ratchet wheel $G^2$ is prevented from further rotating. The arrangement, as mentioned, is so designed that at the moment at which all pins $g^4$ lie against the corresponding stops $a^1$, the scale disc of the indicator device once more resumes its zero position. The machine is then straightway ready for the next measurement.

Owing to the fact that the parts $k^3$ which can be lifted off the driving roller B are not themselves designed as measuring agencies, but only serve by being lifted up to couple the shaft $d^1$ constantly and positively linked up to the driving shaft B, with the driving agencies G of the adding mechanism, the essential advantage is secured of an exceedingly great simplification and cheapening of the entire gear requisite for operating the adding mechanism. It is no longer necessary in the subject matter of the present invention to insert a bulky pinion gearing between each part which can be lifted off ($k^3$) and the corresponding driving disc (G) of the adding mechanism; on the contrary for the entire area measuring machine a single gear of this kind serves. Owing to the permanent connection of the driving roller B with the shaft $d^1$ intended for rotating the driving agencies of the adding machine, however there is further secured a considerably improved mode of operation than is shown by leather measuring machines in which the positive connection in question is only brought about each time directly before the beginning of the measuring process proper, by the lifting off of a pressure roller. It is clear indeed that with leather measuring machines of the kind last mentioned, the least accurate meshing of teeth, and consequently rapid wear of the teeth takes place, while with the present invention, accuracy of mesh is permanently guaranteed.

A further advantage of the present invention lies in the fact that when the machine is put back into the zero position under the action of the power attacking the band $g^1$, no undesirably rapid movement ending in a jerk can take place on the gearing parts. On the contrary the return takes place at a speed which can be determined before-hand and without a jerk or shock.

Claims.

1. An area measuring machine for use in connection with an indicating device comprising a driving roller, a driving shaft, means connecting said roller to said shaft, means functioning proportionally to said driving roller for operating the indicating device, means for preventing an operation of said indicator operating means and means operatable by the material to be measured for rendering said operation preventing means inactive.

2. An area measuring machine for use in connection with an indicating device comprising a driving roller, a driving shaft connected thereto, feelers bearing upon said driving roller, the material to be measured being fed through said machine between said driving roller and said feelers, indicator operating means functioning proportionally to said driving roller, means normally preventing an operation of said indicator operating means and means operatable by said feelers, when the material to be measured is passed through the machine, for rendering said operation preventing means inactive.

3. An area measuring machine adapted for the measurement of leather comprising a driving roller, a shaft for said roller, feelers bearing upon said driving roller, the material to be measured being fed through said machine between said driving roller and said feelers, a second rotatable shaft, means on said second shaft for operating an indicator device, means preventing an operation of said indicator operating means, means operated by said feelers for rendering said operation preventing means inactive and a reversing gear interposed between the driving roller shaft and said second shaft and operatively connecting the same.

4. An area measuring machine of the class described comprising a driving roller, feelers bearing upon said driving roller, the material to be measured being fed through said machine between said driving roller and said feelers, a rotatable shaft, driving members for an indicating device mounted on said shaft, friction clutch members for coupling said driving members to said shaft, ratchet gears rigidly secured to one of each of said clutch members and to its corresponding driving member, ratchets engaging said ratchet gears to prevent rotation of said driving members in one direction and means connected to and operated by said feelers for releasing said ratchet gears to permit the driving members to function when the piece of material to be measured is passing through the machine.

5. An area measuring machine of the class described comprising a driving roller, two sets of cooperating pressure rollers, means supporting each set of pressure rollers whereby they are resiliently pressed toward said driving roller, said driving roller and said pressure rollers cooperating to feed the material to be measured through the machine, a rotatable shaft, driving means on said shaft for operating an indicating device, clutch members associated with said driving means for coupling the same to said shaft, ratchet wheels associated with each of said clutch members, pawls engaging said ratchet wheels, the mounting means of one set of said pressure rollers comprising double crank arms one of each of said crank arms supporting a roller of said set of pressure rollers, the other arm of said double crank arm operatively engaging said pawl whereby when material to be measured is fed through said machine, said second set of pressure rollers will be moved away from said driving roller and said pawls disengaged from the ratchet wheels, thus permitting said driving means to function.

6. An area measuring machine of the class described comprising a driving roller rotatably mounted, two sets of pressure rollers, said pressure rollers and driving roller cooperating to feed the material to be measured through said machine, a rotatable shaft, driving discs upon said shaft operatively connected to an indicating device, friction clutch members, one part of each clutch being associated with a driving disc and the other secured to said shaft, ratchet wheels rigidly secured to each of said driving discs, pawls for engagement with said ratchet wheels, means operated by one set of said pressure rollers for releasing said pawls to permit said shaft to rotate said driving discs, a guide plate associated with one set of pressure rollers, said guide plate being disposed and shaped so as to direct the material to be measured between said roller and pressure rollers.

7. An area measuring machine adapted for the measuring of leather comprising a driving roller, a shaft rotatably supporting said driving roller, two sets of pressure rollers, said pressure rollers and driving roller cooperating to feed the material to be measured through said machine, a second shaft, driving discs loosely mounted upon said second shaft for operating an indicating device, clutches associated with each driving disc and said shaft for coupling said driving discs to said shaft, a pawl and ratchet mechanism associated with each clutch for controlling its operation, means operatively connecting one set of pressure rollers to said pawl and ratchet mechanisms whereby said pawl and ratchet mechanisms may be disengaged to permit said clutches to function, guide plates associated with the other set of pressure rollers, said guide plates extending between said sets of pressure rollers and said driving roller and being shaped so as to direct the leather to be measured therebetween and prongs formed on said guide plates extending in a longitudinal line between said sets of pressure rollers.

8. An arrangement of the class described comprising a driving roller, cooperating pressure rollers whereby the material to be measured may be fed through the machine, driving discs for operating an indicating device, means controlled by one of said sets of pressure rollers for causing said driving discs to function, a receiving table disposed rearwardly of said driving roller, said driving roller being provided with circumferential grooves and stripping prongs secured to said table with their free ends disposed in said grooves whereby the material to be measured will be stripped from said driving roller and put upon said receiving table.

The foregoing specification signed at Essen, Germany, this 26th day of July, 1920.

HERMANN THUN.

In presence of—
HANS GOTTSMANN,
JOHANN DECKERS.